A. M. KENNEDY.
FENDER FOR AUTOMOBILES AND OTHER VEHICLES.
APPLICATION FILED JULY 5, 1913.
1,140,164.
Patented May 18, 1915.
2 SHEETS—SHEET 1.
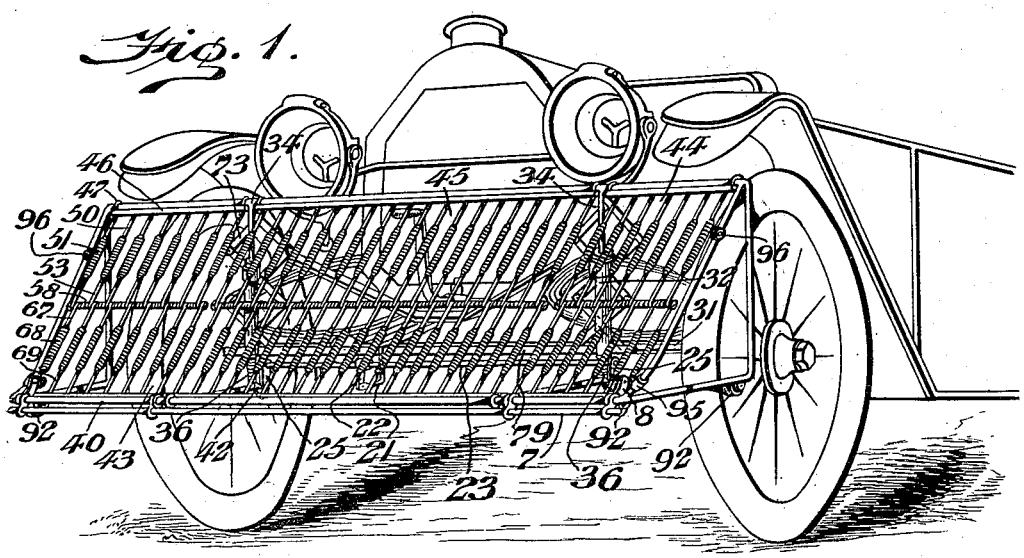
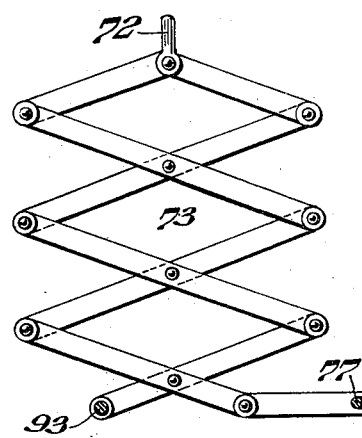
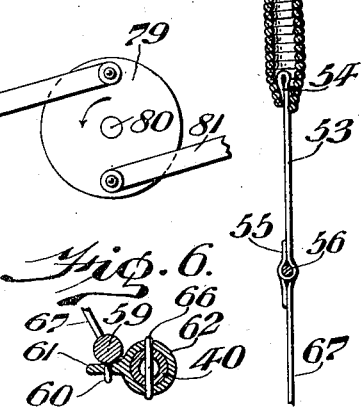
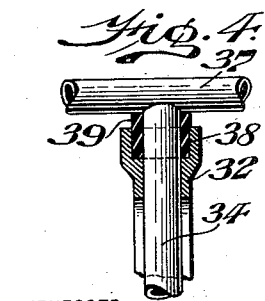
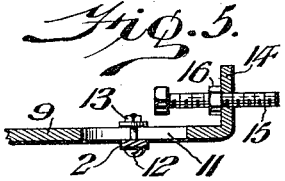
WITNESSES
H. E. Dieterich
O. F. Nagle
INVENTOR
Arthur M. Kennedy
BY Wiedersheim & Fairbanks
ATTORNEYS A. M. KENNEDY.
FENDER FOR AUTOMOBILES AND OTHER VEHICLES.
APPLICATION FILED JULY 5, 1913.
1,140,164.
Patented May 18, 1915.
2 SHEETS—SHEET 2.
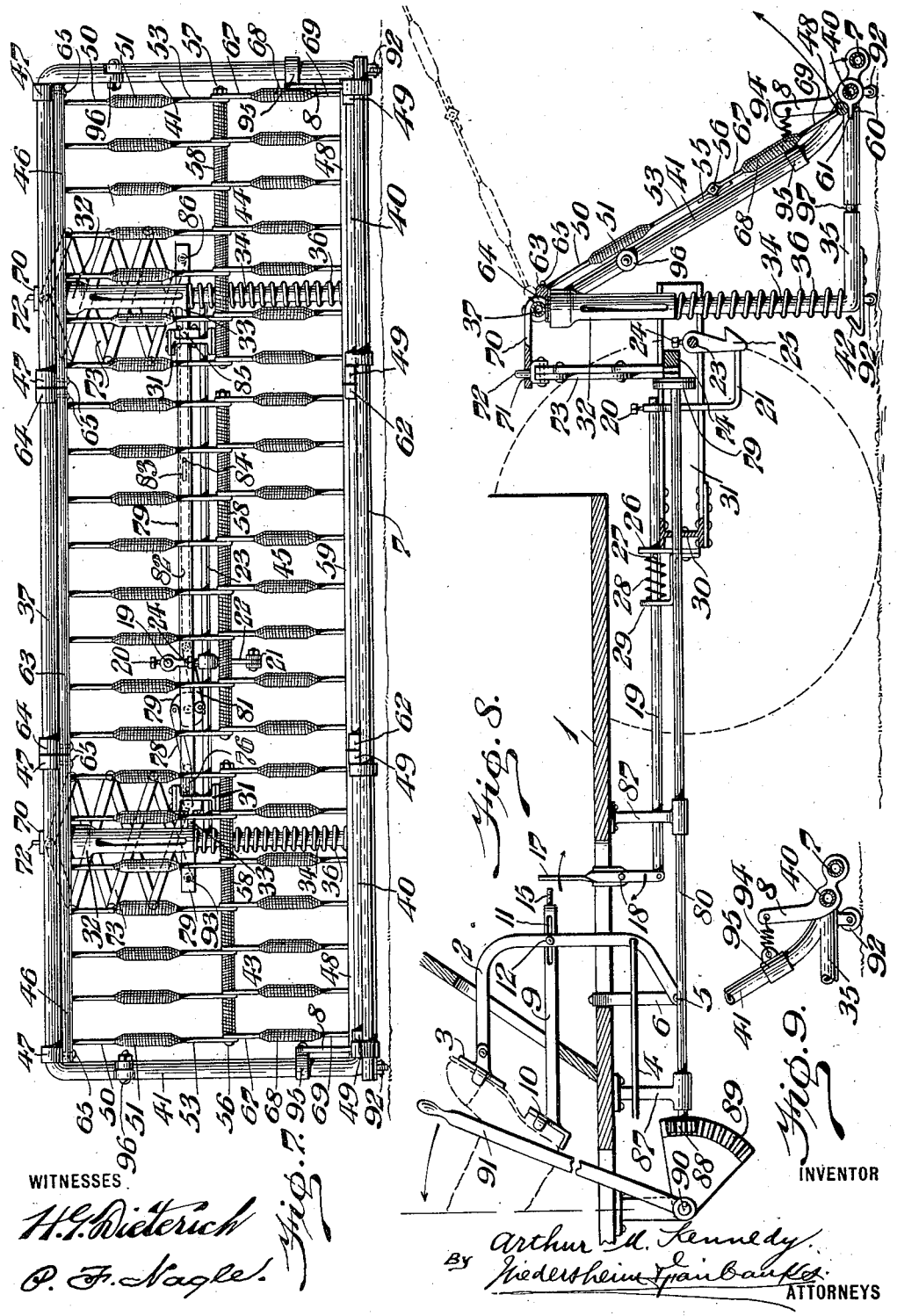

UNITED STATES PATENT OFFICE.

ARTHUR M. KENNEDY, OF PHILADELPHIA, PENNSYLVANIA.

FENDER FOR AUTOMOBILES AND OTHER VEHICLES.

1,140,164.  Specification of Letters Patent.  Patented May 18, 1915.

Application filed July 5, 1913. Serial No. 777,425.

*To all whom it may concern:*

Be it known that I, ARTHUR M. KENNEDY, a citizen of the United States, residing in the city and county of Philadelphia, State of Pennsylvania, have invented a new and useful Fender for Automobiles and other Vehicles, of which the following is a specification.

My present invention relates to a fender designed to be employed in conjunction with any desired type of vehicles, and is especially designed to be employed in conjunction with automobiles.

As is well known, it is almost an every day occurrence for persons to be more or less seriously injured by being run into by automobiles, and as ordinarily constructed, no provision is made for preventing injury to a person who is knocked down or run into by the automobile or other moving vehicle.

Among the numerous requirements which are essential to the satisfactory working of a device of this character, attention is directed to the following which arise in the practical operation of the fender. The fender should be supported in such a manner that its operation will be under the control of the operator and will operate at a high speed, since otherwise the speed, at which the automobile is traveling, might prevent the lowering of the fender in time to accomplish its function. It is also essential that the fender shall be supported, when in normal position, a sufficient distance above the road so that the same will not be injured by contact with road obstructions. It is also advantageous to construct the fender so that portions thereof may be readily removed to inspect the working mechanism or to crank the car in case the same is not provided with a self-starter. It is also essential that the fender will protect the person being struck from injury by any portions of the car and the fender should be assembled in such a manner as not to interfere in any way with the lateral movements of the wheels during the steering operation. It is also advantageous to provide a construction which, at the will of the operator, can be readily returned to its normal position after the same has been lowered.

With the above objects in view and other objects and advantages which will hereinafter appear in the detailed description, my invention consists of a novel fender for automobiles or other vehicles.

It further consists of a novel fender and novel operating means therefor, whereby the same can be controlled by the same foot which operates the vehicle brakes.

It further consists of a novel construction of a fender, novel means for releasing the same, and novel means for returning the fender to its normal position.

It further consists of a novel construction of a fender wherein a portion thereof is constructed in such a manner as to render the parts inwardly thereof readily accessible for the purpose of inspection or repairs.

It further consists of other novel features of construction, all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a perspective view of a portion of an automobile having a fender embodying my invention, in assembled position with respect thereto. Fig. 2 represents a sectional elevation of a portion of the operating mechanism. Fig. 3 represents a sectional elevation of a portion of the fender, showing more clearly the spring construction. Figs. 4, 5 and 6 represent respectively, on an enlarged scale, certain details of the construction. Fig. 7 represents a front elevation of the fender, certain parts thereof having been removed for sake of clearness of illustration. Fig. 8 represents a sectional elevation of a portion of a vehicle showing more clearly the construction of a fender. Figs. 9 and 10 represent respectively, sectional views of details of construction.

Similar numerals of reference indicate corresponding parts in the figures.

Referring to the drawings:—1 designates the frame of an automobile or other vehicle in conjunction with which my novel fender is employed.

2 designates a lever provided with a foot receiving portion 3 and a rod 4, which latter extends to the brake on the rear axle of the vehicle, it being understood that the said lever 2 is pivoted at 5 to a bracket 6 carried by the frame 1.

9 designates a plunger having a portion 10 adapted to receive the heel of the driver, said plunger being provided with a slot 11, through which a bolt 12 passes, which is provided with a washer and nut 13, whereby the lever 2 may be moved independently of the plunger 9. The forward end of the plunger 9 is laterally deflected, as at 14, and is provided with a set screw 15 which may be locked in position by a lock nut 16. Mounted in the path of the screw 15 is a lever 17, which is pivoted at 18 to the frame 1, said lever 17 having pivoted thereto one end of a rod 19, the other end of said rod having connected therewith, by means of a fastening device 20, a link 21. This link 21 is pivoted to a rock-arm 22 fixed on a shaft 23 by means of a fastening device 24. A desired number of hooks or catches 25 are mounted on the shaft 23. The rod 19 passes through a bracket 26 and is provided with a pin 27, adapted to contact with a portion of said bracket to limit the forward movement of the rod 19 and in order to maintain the rod 19 in its normal position, a spring 28 is provided interposed between said pin 27 and an arm 29 on said bracket, it being noted that the bracket 26 is secured in any desired manner to the front axle 30 of the vehicle.

31 designates bars secured in any desired manner to the front axle 30, said bars and axle being shown for purposes of illustration as consisting of I-beams. The shaft 23 is journaled in the bars 31.

32 designates sleeves which are provided with flanges 33, seen in Fig. 7, which latter are secured in any desired manner to the forwardly extending bars 31.

34 designates rear fender rods, which are adapted to telescope into the sleeves 32, and between the bottom of the sleeve 32 and the forwardly extending base portions 35 of the fender are interposed the springs 36. As will be best seen from Fig. 4, the rods 34 are connected at their upper ends with a cross-bar 37, and in order to eliminate in a large measure any shock or noise, the sleeves 32 are recessed at their upper end, as indicated at 38, thereby adapting the same to receive an elastic bumper, such as the rubber tubing 39. The bars or rods 35 are connected at their forward end with a front bar 40 and bars 41 angularly inclined with respect thereto and connected with the cross-bar 37. The bottom bars or rods 35 are provided with the members 42, with which the hooks 25 engage to maintain the fender in its normal position.

It will now be understood that the fender frame includes the upper cross-bar 37, the lower cross-bar 40, the bottom bars 35, four of which are shown in the present instance, and the perpendicularly extending bars 34. The two intermediate bars 34 are provided with the springs 36. The fender proper, that is the resilient portion, consists of end portions 43 and 44 and a central portion 45, said central portion being removable and said end portions being fixed. The end portions each comprise an upper rod 46 secured to the upper cross-bar 37 by the rings 47.

48 designates the lower rod connected to the lower cross-bar 40 by rings 49. The construction of the spring elements will be best understood by reference to Fig. 3, from which it will be seen that a headed rod 50 is provided passing through an upper rod and having its ends extending into a coiled spring element 51 and then rearwardly deflected, as at 52.

53 designates a rod having its end extending into the spring element 51 and then rearwardly deflected, as at 54. The lower ends of said rod 53 are rearwardly deflected as at 55, around a transverse rod or bolt 56, which is provided with a nut 57, whereby the upper and lower spring elements are assembled with respect to the upper and lower rods 46 and 48 respectively.

58 designates springs carried by the headed rod 56 whereby the upper and lower spring elements are maintained in proper alinement.

The central removable section 45 comprises the lower rods 59, which are provided with pins 60, adapted to fit into the apertured flanges 61 of the rings 62 carried by the bottom cross-bar 40. The lower cross-bar is connected with spring elements, similar in construction to those just described, so that a detailed description thereof is unnecessary and would be needless repetition, it being simply necessary to state that the upper cross-rod 63 is connected with the collars 64 mounted on the upper cross-bar 37 by means of pins 65, as will be understood by reference to Fig. 7. It will thus be seen that if it is desired to crank the engine, it is simply necessary to spring the pins 60 out of the apertures of the flanges 61 and swing the central portion 45 of the fender upwardly, as indicated by dotted lines in Fig. 8. The rings 62 may be fixed with respect to the lower cross-bar 40 in any desired manner, and in Fig. 6, I have shown this as being accomplished by means of a pin 66.

It will be understood that the rods 67 are connected with the rods 56 and are connected with a spring element 68 similar to the spring element 51, said spring element 68 being connected by means of a rod 69, with a lower cross-bar 48. The upper cross-bar 37 has fixed thereto a plurality of brackets 70, which are apertured, as at 71, to receive a rod 72, carried by a toggle 73, said toggle lever 73 having one end thereof connected with a cross-bar 74 carried by the bars 31, while the other end of said toggle lever is connected with a link 75 having a slot 76, into which extends a pin 77 fixed to the bar 74. The link 75 is pivoted to a link 78, which latter is eccentrically connected with a disk 79, mounted on a shaft 80. 81 designates a link separately connected with the disk 79 and with a link 82, which is slotted, as at 83. 84 designates a pin carried by the bar 74 and extending into the slot 83. The link 82 is also connected with one end of the toggle lever at the opposite end of the fender, as seen at 85. The other end of the toggle lever at the end of the fender just referred to, is pivoted at 86 to the bar 74.

It will be seen from the above that the toggle levers 73 are simultaneously actuated and may be controlled by the shaft 80. The shaft 80 is mounted in brackets 87 and is provided with a pinion 88, which is adapted to intermesh with a quadrant 89 carried by the shaft 90, to which is connected a manually actuated lever 91. The fender is preferably provided with a desired number of rollers 92, in order to reduce the friction when the fender is in close proximity to the ground.

The operation of my novel fender will now be readily understood by those skilled in the art to which this invention appertains, and is as follows: The driver, by placing the ball of the foot on the foot-receiving portion 3, and his heel on 10, can actuate the brake, by pushing the ball of the foot forward as desired, without operating the fender. If, however, he desires to operate the fender, the latter can be operated simultaneously with or independently of the brake, as desired, since it is only necessary in the former case to press both heel and toe forward and in the latter case to press with the heel only, of his shoe on the plunger 9, whereupon the forward end thereof, which consists of the set screw 15, will contact with the lever 17, thereby causing the same to move in the direction of the arrow seen in Fig. 8. This will cause the rod 19 to move rearwardly against the tension of the spring 28 and owing to the provision of the link 21 and the rock-arm 22, the shaft 23 will be rocked and thereby cause the hooks 25 to become disengaged from the brackets or catches 42. When the fender is released in this manner, the springs 36, in addition to the weight of the fender, cause the latter to move downwardly into contact with the roll, so that the rollers 92 travel along the road surface and since the lower cross-bar 40 is in close proximity to the ground, any object or person in the path of the fender will be received thereon without injury.

When it is desired to return the fender to its normal position, it is simply necessary to manually move the lever 91 in the direction of the arrow seen in Fig. 8, thereby causing the shaft 80 to rotate and actuate the toggle levers which will cause the fender to be raised into such a position that the hooks 25 will engage with the brackets 42, the ends of which are reversely curved, as seen in Fig. 8.

It will be apparent that the stroke of the plunger 9 may be varied, as desired, by the proper adjustment of the lock nuts 16 and the screw 15. It will also be apparent that I have devised a simple and economical construction, which is not liable to get out of order and which can be actuated at the will of the operator.

I preferably provide a buffer 7 mounted on the front bar 40 and provided with arms 8, to which are connected springs 94, the other ends being connected to clamps 95 on the bars 41, the latter being preferably sectional and hinged together at 96. The base portions 35 are preferably sectional, one section being provided with the rod 97 telescoping in the other section and with which coacts a tension device 98. A resilient buffer is thus provided.

It will now be apparent that I have devised a novel and useful construction of a fender for automobiles and other vehicles, which embodies the features of advantage enumerated as desirable in the statement of the invention and the above description, and while I have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a device of the character stated, supports, a fender movable thereon, a tension device for said fender, a hook to retain said fender in normal position, a plunger, means in the path of said plunger to release said hook, brake controlling means positioned to be operated simultaneously or independently with said releasing means, and a single foot control for both the fender and brake.

2. In a device of the character stated, supports, a fender movable thereon, a tension device for said fender, a hook to retain said fender in normal position, a plunger, means to vary the length of said plunger, means in the path of said plunger to release said hook, brake controlling means positioned to be operated simultaneously or independently with said releasing means, and a single foot control for both the fender and brake.

3. In a device of the character stated, supports, a fender movable thereon, a tension device for said fender, a hook to retain said fender in normal position, a plunger, means in the path of said plunger to release said hook, brake controlling means positioned to be operated simultaneously or independently with said releasing means, means to return said fender into locking engagement with said hook, and a single foot control for both the fender and brake.

4. In a device of the character stated, supports, a fender vertically movable therewith, a tension device for said fender, a hook to retain said fender in normal position, a plunger, means in the path of said plunger to release said hook, a tension device to return said means to normal position, brake controlling means positioned to be operated simultaneously or independently with said releasing means, and a single foot control for both the fender and brake.

5. In a device of the character stated, a fender, supports therefor, locking means for said fender, a connection to release said locking means, a plunger in the path of which said connection is mounted and adapted to be operated by the heel of the operator, and braking means located to be operated by the toe of the same foot of the operator, either independently of or simultaneously with said plunger.

6. In a vehicle fender the combination of a fender member movable to operative or inoperative position, means for moving said fender member from operative to inoperative position, means for temporarily retaining said fender member in inoperative position, and a pedal having two members, both operated by one and the same foot, one of said pedal members being connected to the brake-operating mechanism and the other being adapted to release the fender retainer.

7. In a vehicle fender the combination of a fender member movable to operative or inoperative position, means for moving said fender member from operative to inoperative position, means for temporarily retaining said fender member in inoperative position, and a pedal having two members both operated by one and the same foot, one of said pedal members being connected to the brake operating mechanism and the other being adapted to release the fender retainer, and either pedal member being movable independently of the other.

8. In a vehicle fender the combination of a fender member movable to operative or inoperative position, means for moving said fender member from operative to inoperative position, means for temporarily retaining said fender member in inoperative position, and a pedal having two members, both operated by one and the same foot, one of said pedal members being connected to the brake-operating mechanism and the other being adapted to release the fender retainer, said pedal members being movable either simultaneously or one independent of the other.

ARTHUR M. KENNEDY.

Witnesses:
FREDERICK G. SCHENKEL,
A. F. PARKER.

Copies of this patent may be obtained for five cents each, by addressing the "Commissioner of Patents, Washington, D. C."